Oct. 6, 1936.　　　　J. S. PECKER　　　　2,056,887
CENTRIFUGAL SEPARATING MACHINE
Filed April 12, 1934　　6 Sheets-Sheet 1

Joseph S. Pecker,
INVENTOR

By

ATTORNEY

Oct. 6, 1936.   J. S. PECKER   2,056,887
CENTRIFUGAL SEPARATING MACHINE
Filed April 12, 1934   6 Sheets—Sheet 2

Joseph S. Pecker,
INVENTOR

By

ATTORNEY

Oct. 6, 1936.   J. S. PECKER   2,056,887
CENTRIFUGAL SEPARATING MACHINE
Filed April 12, 1934   6 Sheets-Sheet 3

Joseph S. Pecker,
INVENTOR

By
ATTORNEY

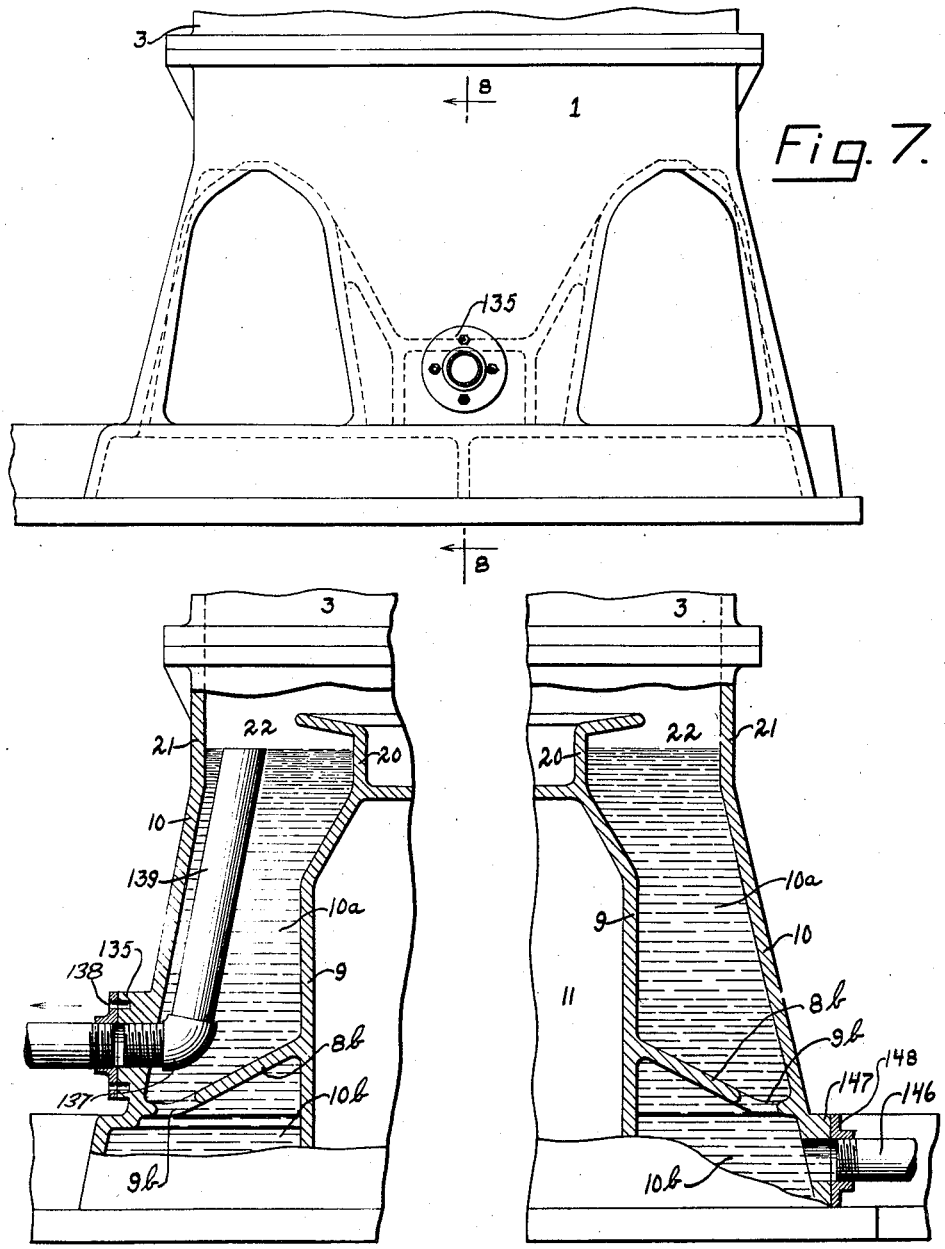

Patented Oct. 6, 1936

2,056,887

UNITED STATES PATENT OFFICE 2,056,887

CENTRIFUGAL SEPARATING MACHINE

Joseph S. Pecker, Philadelphia, Pa., assignor to American Centrifugal Corporation, New York, N. Y., a corporation of Delaware Application April 12, 1934, Serial No. 720,333

26 Claims. (Cl. 210—63)

The invention relates to a centrifugal machine for separating liquids from solids by centrifugal action and is an improvement or modification of the centrifugal machine shown, described and claimed in a copending application filed by me on or about the 21st day of February, 1934, Serial No. 712,390, and equipped with means for feeding sludge material to a rotary centrifugal basket automatically and for rotating the basket at a high speed during a predetermined period for effecting the purging operation and also at a predetermined period at a low speed for cleaning or unloading the basket.

The present invention is also an improvement on the centrifugal machine shown, described and claimed in my co-pending application filed on or about February 28, 1934, Serial No. 713,383 and having in connection with the rotary centrifugal basket and the means for rotating the basket at a high purging speed and a low cleaning speed a chemical or sedimentation tank arranged to receive the effluent separated from the material by the centrifugal action of the basket and adapted to enable the effluent to be treated by aeration, chemical or other treatment for clarifying and purifying the effluent.

It is an object of the present invention to provide in a machine having the said rotary centrifugal basket and a sedimentation or effluent receiving tank separate vacuum means for the removal of clarified effluent from the tank and for also removing sedimentation sludge precipitated or deposited in the tank.

A further object of the invention is to provide separate vacuum means of this character adapted to take off the clarified effluent from the surface or upper portion of the liquid within the effluent receiving tank and to remove sedimentation sludge from the bottom or lower portion of the sedimentation tank.

It is also an object of the invention to enable the vacuum means to remove the clarified or purified effluent from the effluent receiving tank at a plurality of points at and adjacent the surface of the liquid and also to drain off and remove from the bottom or lower portion of the tank at a plurality of points the sedimentation sludge precipitated or settling in the said tank.

Another object of the invention is to provide means for preventing turbulence of the liquid within the effluent receiving and settling tank adapted to separate the lighter liquids and clarified effluent from the heavier liquids and sedimentation sludge and capable of permitting free communication between the upper and lower portions of the tank and at the same time reducing to a minimum the liability of any agitation or turbulence of the sedimentation sludge causing a return of the sedimentation sludge to the upper portion of the tank and a mixing of the same with the clarified effluent.

Another object of the invention is to arrange the high speed motors of the centrifugal separating machine adjacent to each other and also to arrange adjacent to each other the vacuum or suction pumps for effecting a separate removal of the clarified effluent and the sedimentation sludge from the tank so that the motors will be in a convenient position with respect to each other and the controlling means and also to facilitate a convenient arrangement of the piping for connecting the vacuum or suction pumps with the tank.

Another object of the invention is to provide a centrifugal separating machine designed primarily for the separation of sludge in which there is material in suspended or colloidal solution with another liquid.

Green sewage coming from the mains is usually screened so that large pieces of wood, rag, stones, and the like are screened out and the sewage then flows through grid chambers where heavy particles of sand, stone, etc. will quickly settle and be eliminated. The sewage then flows into settling tanks wherein the sludge in suspension settles to the bottom of the tanks and the clarified water or effluent is conducted off. The settled solids material is called sludge.

The effluent from the primary tank then takes one of several courses depending on the character of the plant. In what is known as a primary treatment plant the effluent is permitted to flow back into rivers, streams, lakes, etc. Where this condition is not permitted by health authorities, the effluent is permitted to run into another settling tank where the effluent is agitated in the presence of injections of air to cause the coagulation of the fine particles held either in suspension or in colloidal state. The coagulated material is known as activated sludge. This material may be then permitted to flow into another tank termed a final settling tank in which the coagulated material drops to the bottom of the tank and the effluent from this settling tank is extremely clear water. The settled solids in this tank are also called activated or aerated sludge but of a more concentrated character than sludge in the aerating tank.

There are other systems known as chemical treatment plants in which the incoming sewage is treated chemically in order to eliminate the activation or aeration of the sludge, as well as the digestion process.

It will thus be seen that there is primary or raw sludge, activated sludge, final settling tank sludge, digested sludge and chemically treated sludge. All of these sludges have a water content of approximately 85% to 98% and in order to facilitate the handling of this material in the final disposition of the sludge, it is essential that the material be dewatered to at least 70% of its moisture so that the material may be handled with a spade or shovel and utilized or burned in incinerators.

It is an object of the present invention to provide a centrifugal separating machine adapted to handle raw, activated or digested sludge, dewatering the same to the desired or required degree and subject the effluent to the action of currents of air, steam, chemicals, inert material or any other similar or desired treatment so that when the effluent is discharged or removed from the machine it will be clear and unobjectionable as desired, and will meet all requirements and regulations as to disposal of such effluent in order that it may be discharged into rivers, streams, lakes, or otherwise disposed of without infringing any regulations concerning the contamination of streams or bodies of water.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:—

Fig. 7 is an elevation of the lower portion of the base illustrating a modification of the tank structure.

Fig. 8 is a vertical sectional view of the same on the line 8—8 of Fig. 7 illustrating an inclined plate or partition for preventing turbulence of the liquid within the tank.

Fig. 9 is a similar view, the section being taken through one of the sedimentation sludge outlets.

In the accompanying drawings in which is illustrated one embodiment of the invention, the centrifugal separating machine comprises in its construction the essential characteristics of the casings shown and described in the aforesaid applications and comprising a lower section 1, upper and lower intermediate sections 2 and 3, and a top section 4 suitably secured together preferably by the means shown and described in the said applications, the top section and the upper intermediate section being removable, as explained in the said applications, to permit the removal of a feeding unit and a basket unit, as fully shown, described and claimed in the aforesaid applications.

Figure 1:
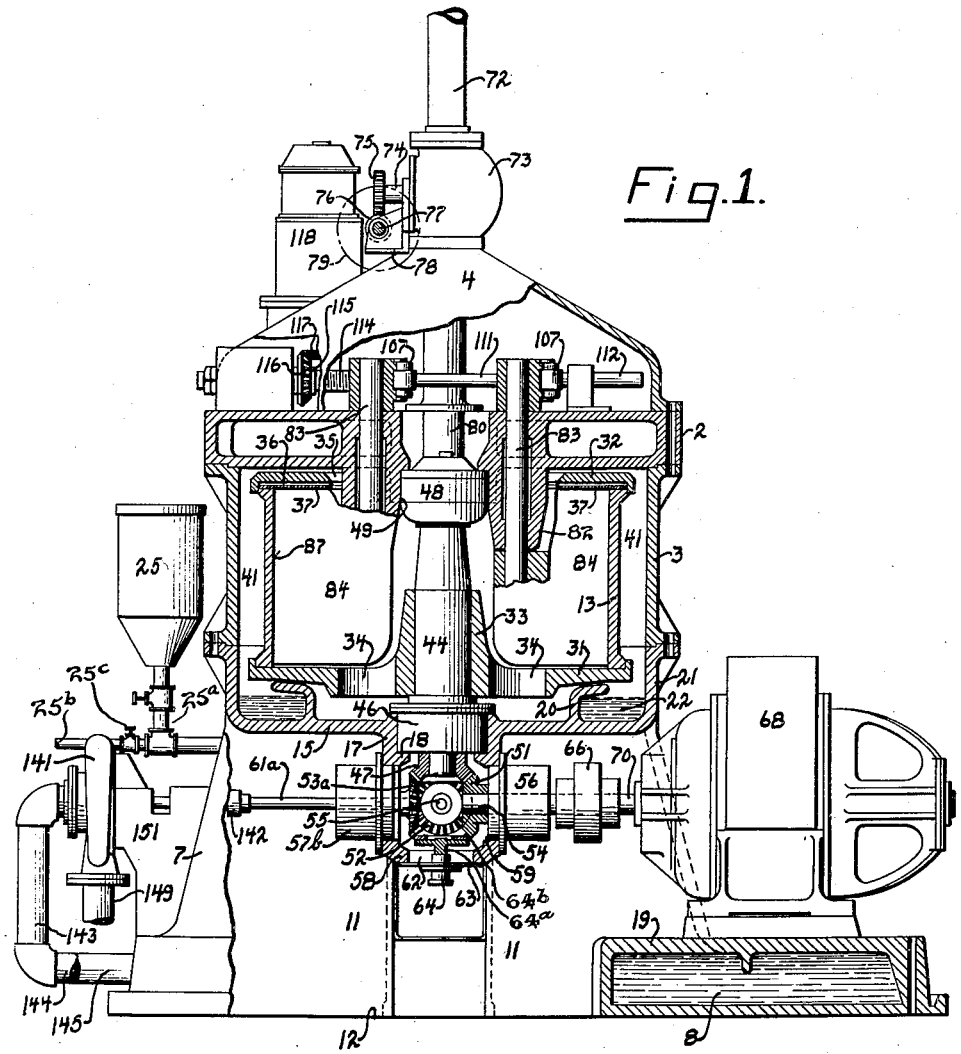
Fig. 1 is a central vertical sectional view of a centrifugal separating machine constructed in accordance with this invention.
Figure 2:
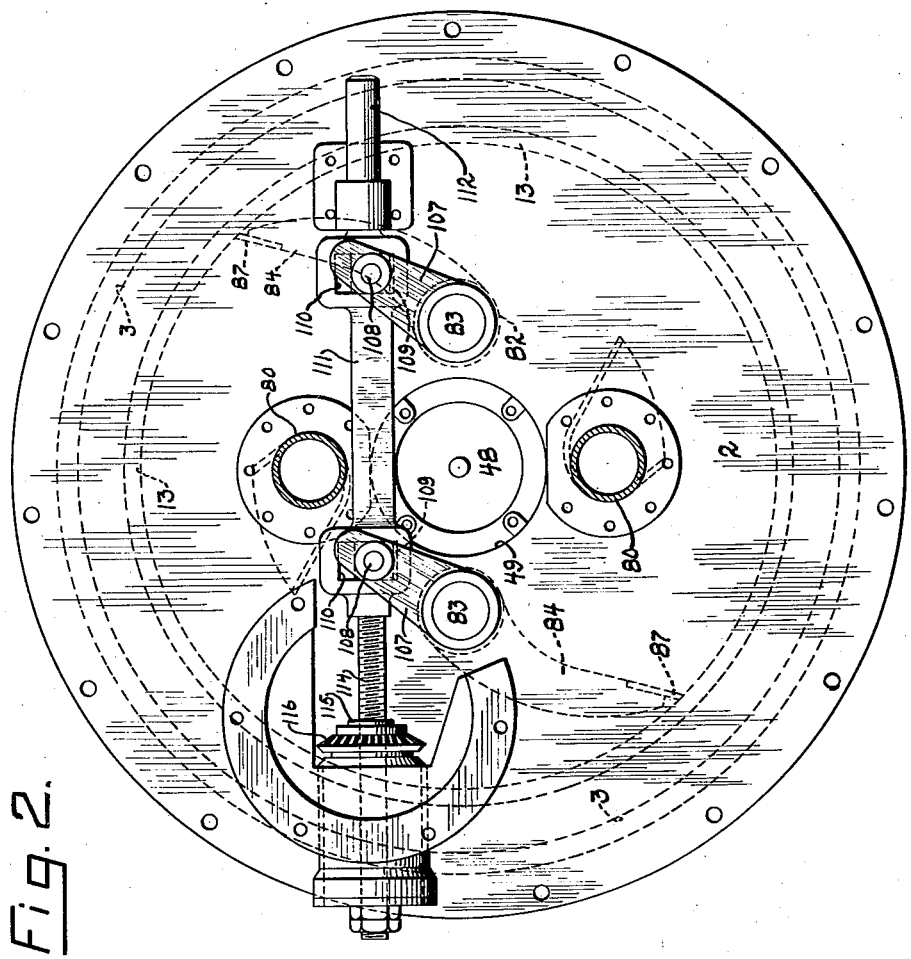
Fig. 2 is a plan view of the upper intermediate section of the casing of the machine illustrating the means for operating the scrapers, the branches of the feed pipe being in section.
Figure 3:
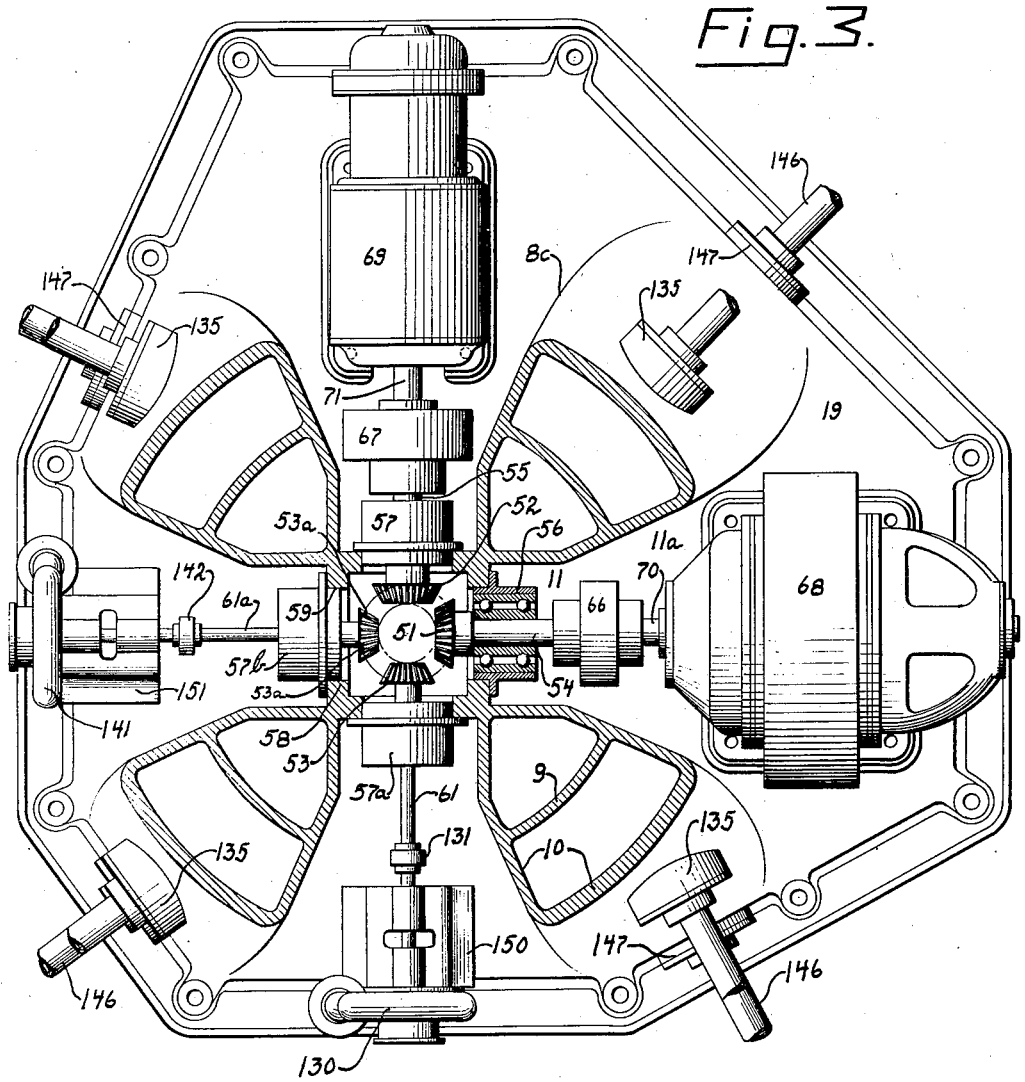
Fig. 3 is a horizontal sectional view through the base of the machine and illustrating the arrangement of the high and low speed motors and the separate vacuum or suction pumps with relation to the effluent receiving and settling tank.

The bottom section 1 is provided with a hollow base 7 preferably cast integral with the bottom section and of irregular octagonal form, as clearly illustrated in Fig. 3 of the drawings, to provide an effluent receiving and settling tank 8. The hollow base which forms the said tank may be varied in shape and size to provide a tank of the desired capacity and instead of forming the tank integral with the casing, any other desired construction of tank may, of course, be provided, as will be readily understood. The said hollow base is provided with inclined hollow side portions forming inner and outer side walls 9 and 10 which support the bottom section 1 of the casing. The said base which forms an interior space 11 and which is open at the bottom at 12 may be conveniently arranged over a pit into which sludge may be discharged when it is unloaded from a centrifugal basket 13, but the sludge may be discharged into an incinerator or onto a conveyor or removed from the basket or otherwise disposed of.

The base is designed to be mounted upon and suitably secured to the walls of a pit or foundation or other support and at the central portion at the top is reinforced by diametrically disposed longitudinal and transverse bracing members 15 and 16 constituting a spider and located above and adapted to shield the gearing and mechanism for rotating the centrifugal basket as explained in the said applications and also for shielding the gearing for operating the vacuum means hereinafter fully described. The said bracing members 15 and 16 prevent sludge discharged from the machine accumulating on the basket actuating means and interfering or otherwise affecting the operation of the basket and vacuum actuating means and operating mechanism. The spider is provided with a central integral bearing supporting ring 17 of cylindrical form provided at its lower end with an inwardly extending annular flange 18 forming a bearing supporting ledge.

The bottom portion 19 of the base is hollow to provide the desired capacity of the effluent sedimentation and settling tank 8. The central opening 12 defined by the inner walls 9 of the base permit the free discharge of sludge through the base of the machine. The bottom section 1 of the casing, as shown and described in the said applications, is circular and consists of a bottom plate provided with inner and outer walls 20 and 21 which form an annular trough 22 for the reception of the effluent discharged from the basket incident to centrifugal action. The annular trough constitutes the mouth or entrance to the tank 8 and the water or other liquid flowing into the annular trough or mouth of the tank 8 collects in the effluent receiving tank where it may be treated with chemicals, steam or inert material and permitted to settle, the precipitate settling to the bottom of the tank and the liquid at the upper portion of the tank being clear.

Figure 5:
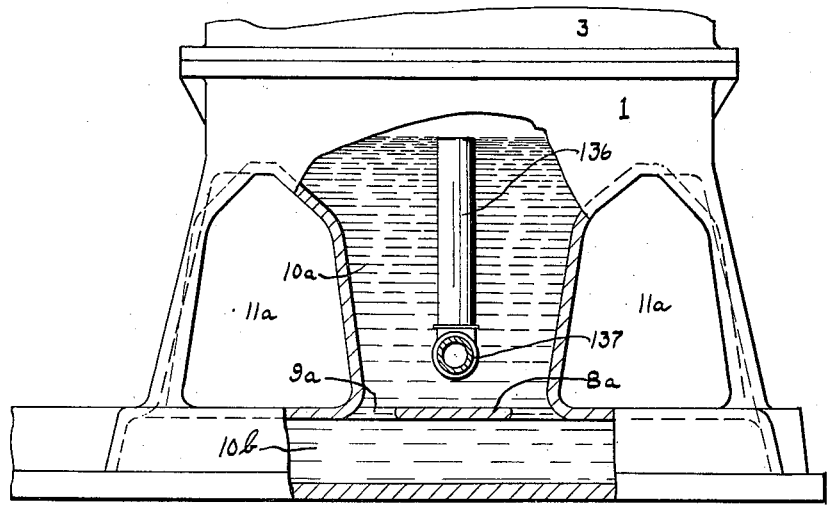
Fig. 5 is an elevation partly in section of a portion of the base of the casing illustrating the arrangement of one of the clarified effluent discharge pipes and a horizontal plate or partition for preventing turbulence of the liquid within the tank.
Figure 6:
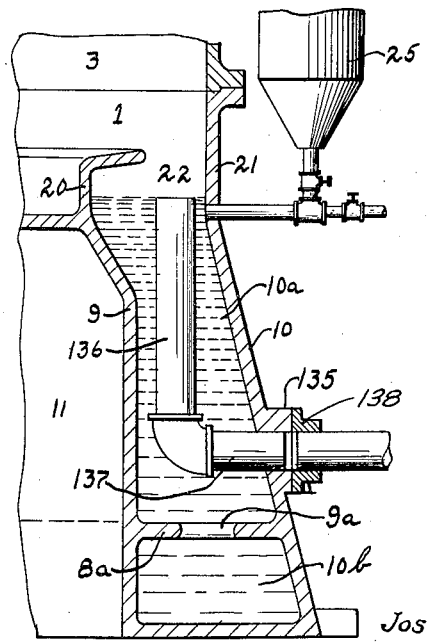
Fig. 6 is a vertical sectional view of the same on the line 6—6 of Fig. 5.

The clear effluent at the upper portion of the tank and the sedimentation sludge at the lower portion of the tank are removed by separate means as hereinafter fully described, and in order to eliminate or reduce to a minimum any turbulence which might cause an agitation of the contents of the tank and a re-mixing of the sedimentation sludge with the clear liquid, the upper and lower portions of the tank are separated by partitions 8ª or 8ᵇ connecting the inner and outer walls 9 and 10 of the tank and provided with openings 9ª and 9ᵇ to permit the sedimentation sludge resulting from precipitation and settling to settle to the lower portion of the tank. In Figs. 5 and 6 of the accompanying drawings the partitions 8ª are shown arranged horizontally and are provided with a plurality of openings 9ª for the passage of the sedimentation sludge from each upper compartment 10ª to the lower compartment 10ᵇ. In Figs. 7 to 9, inclusive of the drawings the partitions 8ᵇ which are inclined extend downwardly and outwardly and the openings 9ᵇ are located at the lower portions of the inclined partitions 8ᵇ, but they may, of course, be arranged at any desired points, as will be readily understood. The inclined partition 8ᵇ separates the upper chamber or compartment 10ª from the lower chamber or compartment 10ᵇ and prevents any turbulence in the upper compartment from being communicated to the liquid in the lower compartment.

The turbulence in the upper compartment caused by the liquid flowing into the mouth of the tank is confined within the upper chamber and liability of such turbulence affecting the liquid in the lower chamber is reduced to a minimum by the dividing or separating partitions 8ᵇ and 8ª and at the same time free flow of the sedimentation sludge from the upper compartments of the tank to the lower compartment is permitted.

The base is provided with four equally spaced upwardly extending hollow portions forming tank sections which provide the upper and lower compartments 10ª and 10ᵇ and these separate tank sections 8ᶜ define diametrically arranged side openings 11ª which communicate with the central opening space 11, as clearly illustrated in Fig. 3 of the drawings. The inner wall 20 of the annular trough or mouth 22 of the tank is provided at the top with an inclined flange extending outwardly and overhanging the inner portion of the said mouth 22, as clearly shown and described in the said application, Serial No. 713,383 for preventing water or other liquid entering the mouth 22 of the tank from splashing over the inner wall and into the central space 11. The walls 20 and 21 are vertical and the outer wall constitutes the bottom portion of the vertical wall of the casing.

The tank may be supplied with chemicals by means of a hopper or receptacle 25, but the chemicals and other material may be introduced into the tank by any other suitable means, as will be readily understood. When the chemical tank 25 is employed it communicates with the effluent receiving tank, and further description and detail illustrative of the tank is believed to be unnecessary.

The pipe connection 25a between the chemical tank and the effluent tank is provided with a branch pipe 25b forming an inlet for enabling air and steam, inert material and the like, to be introduced into the effluent tank when desired. The inlet branch 25b is provided with a suitable valve 25c for controlling the inlet pipe 25b and also for closing the same when it is desired to use chemicals only for treating the effluent.

The casing of the centrifugal automatic separating machine may be of any desired construction, but it is preferably constructed as shown and described in the said applications and the lower intermediate section 3 is cylindrical and the upper intermediate section 2 is circular and constitutes a spacing and supporting member. The top section 4 which is tapered upwardly constitutes a cap and houses the mechanism supported upon the intermediate section 2, as explained in the aforesaid applications.

The centrifugal basket 13, as explained in the said applications, consists of a cylindrical body portion, a circular bottom plate 31 and a circular top plate 32. The cylindrical body portion of the basket 13 forms imperforate vertical walls and the bottom plate of the basket has a horizontal upper face and is provided with a central hub 33 and has a plurality of radial openings 34 surrounding the hub for the discharge of sludge from the basket.

The top plate 32 of the basket is of annular form and provides a central opening 35 and it has an annular series of radial channels 36 which are covered by a screen or seepage plate 37. The channels and seepage plate which may be varied in construction and arrangement, may be constructed, as shown and described in the said applications, and as the particular construction of the seepage means does not constitute a portion of the present invention, further description thereof is deemed unnecessary.

The water or other liquid removed from the material through the centrifugal action of the rotary basket flows upwardly and outwardly through the seepage means which, as explained in detail in the said applications, discharges the water radially and downwardly into an annular space 41 between the rotary basket and the casing of the machine. The water or other liquid flowing downwardly through the said space 41 enters the effluent receiving tank 8 through the circular mouth 22 and may be treated chemically, but currents of air, steam, and inert material to produce the desired chemical or biological action and the desired precipitation settling and clarification of the effluent and the separation of sedimentation sludge from the clear liquid may be employed.

The hub 33 of the bottom plate of the basket is mounted on and suitably fixed to a central vertical shaft 44 having its lower portion journaled in lower bearings 46 mounted in the bearing supporting ring 17 and designed to be constructed similar to the bearings shown and described in said application, Serial No. 712,390. Any suitable lower bearings may, of course, be employed for mounting the lower portion of the vertical shaft 44. The bearings are fully enclosed as shown and are fully protected from the material operated on by the machine so that there is no liability of any of the sludge coming in contact with the lower bearings.

The lower end of the vertical shaft 44 has keyed or otherwise secured to it a horizontal bevel gear 47 and the upper terminal portion of the vertical shaft is mounted in upper bearings 48 designed to be constructed similar to the bearings of the said applications and mounted in a central opening 49 in the upper intermediate supporting section 2 of the casing of the machine.

The horizontal bevel gear 47 meshes with vertical bevel gears 51, 52, 53 and 53a. The vertical bevel gears 51 and 52 are keyed or otherwise fixed to horizontal motor actuated shafts 54 and 55 mounted in suitable bearings 56 and 57 supported in a gear case 58. The gear case 58 is formed integral with and depends from the bearing supporting ring 17 and it constitutes a shaft hanger for supporting the said shafts 54 and 55.

The gear case is provided at four sides at diametrically opposite points with four circular openings 59 which receive bearings for the shafts upon which the said gears 51, 52, 53 and 53a are mounted.

The shafts 54 and 55 are arranged at right angles to each other and the bearings 56 and 57 of said shafts are located in two of the openings 59 and the other two openings receive bearings 57a and 57b for horizontal shafts 61 and 61a to which the vertical bevel gears 53 and 53a are keyed or otherwise secured. The housings of the bearings 56, 57, 57a and 57b are suitably secured to the gear case and they close the side openings thereof.

The gear case is also provided at the bottom with an opening 62 which is normally closed by a bottom plate 63 suitably secured to the gear case and supporting an oil pump 64 constituting a portion of the lubricating system disclosed in said application, Serial No. 712,390. The pump is of the rotary type and is provided at the upper end of its vertical shaft 64a with a horizontal bevel gear 64b, which meshes with the vertical bevel gear 51 at the bottom thereof, but any other desired arrangement of gearing may, of course, be employed for operating the pump and as the lubricating means is designed to be constructed substantially the same as that disclosed in said application, Serial No. 712,390, and as it does not constitute a portion of the present invention, further description and illustration thereof are deemed unnecessary.

The shafts 54 and 55 which are connected by suitable clutches 66 and 67 are arranged at right angles to each other and are connected by said clutches with a high speed motor 68 and a low speed motor 69 mounted upon the base and arranged at right angles to each other, as clearly illustrated in Fig. 3 of the drawings. The clutches 66 and 67 which connect the motor actuated shafts 54 and 55 with the shafts 70 and 71 of the high speed motor and the low speed motor are designed to be constructed similar to the clutches of said applications, and as clutches of any desired construction may be employed, detail description and illustration thereof are deemed unnecessary in the present application.

The high speed motor rotates the centrifugal basket at high speed for purging and the low speed motor rotates said basket at a slow speed for unloading and as the cycle of operation of the machine is designed to be substantially the same as that described in the said applications, further description of the same is unnecessary.

The sewage or other material to be dewatered is fed to the centrifugal machine, as explained in the aforesaid applications, through a vertical feed pipe 72, and the flow of the material into the machine is controlled by a standard valve 73 supported upon the top or cap section of the casing and having a horizontal rotary valve stem or shaft 74 to which is secured a worm wheel 75 which meshes with a worm 76 of a shaft 77 journaled in suitable bearings of a supporting bracket 78 and designed to be provided with a hand wheel 79. The valve in the continuous operation of the automatic centrifugal machine is designed to be periodically operated by a standard electrically controlled unit, as explained in said application, Serial No. 712,390 for feeding sewage or other material during a portion of a cycle of the operation of the machine and for shutting off the flow of material during another portion of a cycle of the operation of the machine. When the shaft 77 is rotated manually or by the standard electrically controlled unit its worm will rotate the worm wheel 75 and open or close the valve according to the direction of the rotation of a shaft 77.

The feed pipe 72 is of the same construction as that shown and described in the said application and it is provided with branch feed portions 80 extending downwardly into the centrifugal basket and discharging into the same at opposite sides thereof.

The intermediate supporting member 2 of the casing of the machine is of substantially the same construction as that shown and described in said applications and it is provided at opposite sides of the center with vertical hubs 82 depending from the supporting member and extending into the upper portion of the centrifugal basket and having mounted within them vertical shafts 83. Mounted upon the lower portions of the vertical shafts 83 are curved scrapers 84 tapered outwardly from the shafts and preferably constructed as shown and described in said application Serial No. 712,390, but they may be of any other desired construction such as that shown and described in the said application, Serial No. 713,383. The scrapers which are arranged vertically are located at diametrically opposite points and are adapted to fold inwardly as explained in said application, Serial No. 712,390, and are moved outwardly by scraper operating mechanism to carry toothed cutting blades 87 into the path of the material 88 collecting on the inner face of the vertical walls of the rotary centrifugal basket 13. The blades 87 cut the material into thin pieces which are directed or converged inwardly towards the center of the rotary basket by the scrapers for causing the cut sludge to fall through the openings in the bottom of the centrifugal basket, but the cut sludge may be disposed of in any other suitable manner, as for instance, by the means shown and described in a co-pending application filed March 9, 1934. Serial No. 714,850.

The scraper operating mechanism for moving the scrapers inwardly and outwardly is designed to be substantially the same as that shown and described in said applications. The upper ends of the shafts 83 are provided with operating arms 107 extending horizontally from the shafts 83 and provided at their outer ends with pivots 108 which are connected with blocks 109 slidably mounted in transverse openings 110 of a longitudinally slidable connecting bar 111. The slidable connecting bar which is arranged transversely of and located above the supporting member 2 of the casing of the machine, is spaced from the center thereof. One portion 112 of the slidable bar 111 is arranged in a suitable guide and at its other end is connected with a screw 114 engaged by an interiorly threaded horizontally disposed sleeve 115. The sleeve is mounted in a suitable bearing and is provided at its inner end with a vertically disposed bevel gear 116 fixed to the interiorly threaded sleeve 115 and meshing with a horizontal bevel gear 117 of an electric motor 118 adapted to be operated for swinging the scrapers outwardly and inwardly. As the scraper operating mechanism and the manner of mounting the same are designed to be the same as that shown and described in the said applications and as such mechanism does not constitute a portion of the present invention, further description of such operating mechanism is deemed unnecessary especially as any suitable operating mechanism may be employed for moving the scrapers inwardly and outwardly.

The clarified or purified lighter effluent is removed from the tank 8 separated from the sedimentation sludge by means of a vacuum or suction pump 130 mounted on the base of the machine at a point diametrically opposite the low speed motor 69 connected by a suitable clutch 131 with a horizontal shaft 61, whereby either when the high speed motor 68 or the low speed motor 69 is operated the suction or vacuum pump 130 may be operated. Any suitable clutch 131 may be employed and any suitable means may be provided for operating the clutch for operatively connecting the suction pump with the shaft 61.

The suction pump 130 is provided with an inlet or effluent drain pipe 132 having branches 133 and 134 extending in opposite directions from the suction pump and communicating with the interior of the tank. The tank is provided at the spaced upwardly extending tank portions 8c with annular bosses 135 surrounding openings at which are secured inwardly extending horizontal portions of the branches 133 and 134 of the effluent drain pipe 132. The branches 133 and 134 may be arranged in any preferred manner, but preferably extend horizontally around the base of the machine and the tank is provided at each of the openings of the bosses 135 with an interiorly arranged stand pipe 136 having a horizontal arm 137 at its lower end also secured in the opening of the associated annular boss 135.

The stand pipe forms a continuation or section of the drain pipe and the vertical portion is of a length to extend to the surface of the effluent and determines the height or level of the liquid within the tank as the overflow is sucked into the stand pipe by the suction pump. The inner end of the horizontal arm 137 of the stand pipe section 136 may be secured to the same by any suitable means, such as by threading, as illustrated in Fig. 8 of the drawings, and the horizontal inwardly extending portions of the branches are secured to the annular bosses by pipe flanges or nipples 138, but any other suitable means may, of course, be employed for this purpose. In Figs. 5 and 6 the stand pipe section of the effluent drain is arranged vertically, but it may be arranged at an inclination as shown at 139 in Fig. 8 of the drawings. The suction pump 130 is provided with an outlet pipe 140 which may extend to any suitable means for the disposal of the lighter liquid or clarified effluent.

The heavier or condensed liquid containing the settlings and precipitate and termed sedimentation sludge is removed from the lower portion of the tank 8 by separate vacuum means consisting of a suction pump 141 arranged adjacent to the suction pump 130 and at a point diametrically opposite the high speed motor.

Figure 4:
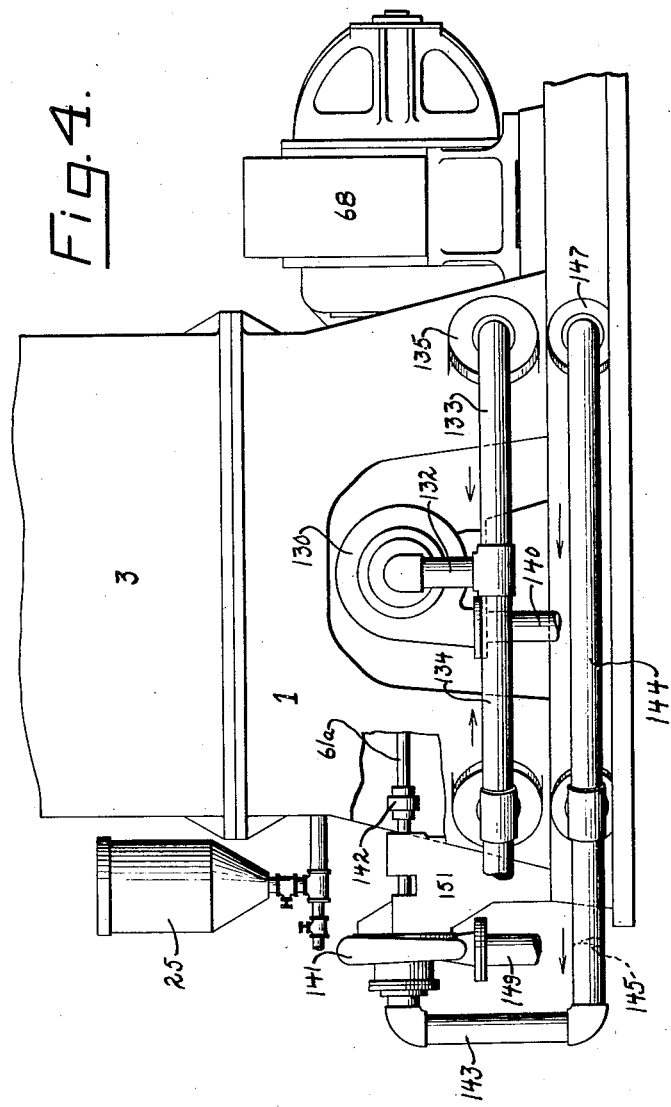
Fig. 4 is an elevation of the lower portion of the machine.

The suction pump 141 is mounted on the base of the machine and is connected by a suitable coupling 142 with a horizontal shaft 61a which is provided at its inner end with the said bevel gear 53a and which meshes with and is rotated by the horizontal bevel gear fixed to the lower end of the vertical shaft of the rotary centrifugal basket. The clutch 142 may be of any desired construction and any suitable means may be provided for operating the clutch to operatively connect the sedimentation sludge pump with the shaft 61a and for disconnecting or unclutching the suction pump 141 from the said shaft 61a. The sedimentation sewage pump 141 is provided with an inlet or sludge drain pipe 143 extending downwardly from the sludge suction pump 141 and provided with branches 144 and 145 having inwardly extending portions 146 extending to annular bosses 147 and connected to the same by means of pipe flanges or nipples 148. The annular boss 147 defines an opening which communicates with the lower chamber or portion 10b of the tank to enable the sedimentation sludge to be sucked from the bottom of the tank through the branches 144 and 145 of the drain pipe 143 and through the sludge pump 141 and the latter is provided with an outlet pipe 149 which may communicate with any suitable means for the disposal of the sedimentation sludge. A drain opening provided by the annular boss 147 is located at the lower portion of the hollow base of the casing at each of the spaced upwardly extending tank portions 8c and the branches of the inlet or sludge drain pipe 143 may be arranged in any suitable manner around the base, but is preferably disposed horizontally at the bottom of the hollow base, as clearly illustrated in Figs. 3 and 4.

By locating the inwardly extending portions of the sedimentation sludge drain pipe below the partitions separating the upper and lower compartments of the tank from each other, the sedimentation sludge may be sucked from the tank and drained off without turbulence of the liquid within the upper chambers 10a of the tank. The suction pumps are mounted on suitable bearings 150 and 151 and by being arranged at two of the adjacent spaces or openings defined by the upwardly extending tank portions of the base the pipe connections are conveniently arranged. Also by arranging the high and low speed motors at adjacent openings or spaces between the said upwardly extending tank portions the wire connections for the motors may conveniently be arranged and the motors are also arranged in a most convenient position for an operator having charge of the machine.

In the operation of the centrifugal separating machine the material to be dewatered is fed at intervals to the centrifugal basket which is rotated at a high purging speed for separating the effluent from the sludge which collects in a cake at the vertical imperforate walls of the basket, the effluent being discharged by the seepage means at the top of the centrifugal basket and flowing downwardly in the space between the basket and the casing into the tank formed by the hollow bottom of the casing or otherwise provided for that purpose.

The dewatered or dry sludge is removed from the basket by the scrapers in the manner explained in the said application, Serial No. 712,390. As the rotary centrifugal basket during the operation of the machine is rotated either by the high or low speed motor the suction pumps which constitute the vacuum means for the separate removal of the clarified or purified effluent and the sedimentation sludge, may be operated at any time and the chemical or other treatment may be applied to the effluent as heretofore explained. The clutch connections between the suction pumps and the means for actuating the same will enable either of the pumps to be operated at will for the effective removal of the clarified effluent and the sedimentation sludge. While it is preferable to mount the suction pumps on the base of the machine and operate the same from the same means for rotating the centrifugal basket it will be clear that the suction pumps may be otherwise arranged and any other suitable means may, of course, be employed for operating the suction pumps.

What is claimed is:

1. A centrifugal separating machine comprising a casing having a hollow base, an effluent receiving tank located within the base and at its upper portion having a mouth to establish communication between the tank and the interior of the casing, a rotary centrifugal basket mounted in the casing and projecting at its lower portion into the base above said tank and having an opening in its bottom, said base having a passage extending vertically therethrough with the inner wall of said tank defining said passage, means for rotating the basket to separate liquids from solids and discharge the liquids from the basket into the casing for discharge to said tank through the said mouth of the latter and to build up a wall of solids within the basket against the side walls of the latter, means for removing the solids from the side walls of the basket through the opening in the bottom of the latter for discharge through said vertical passage of the base, and separate power actuated means mounted on the base and communicating with the tank for separately removing effluent and sedimentation sludge from the tank.

2. A centrifugal separating machine comprising a casing including a hollow base comprising a hollow substantially horizontal portion and spaced inner and outer upwardly extending walls rising from the substantially horizontal portion of the base to provide a tank, the tank having an open mouth at the upper portion thereof to establish communication between the interior of the casing and the tank, the inner walls of the tank defining a passage through the base and which is open at the top and bottom, a partition in the tank to divide the tank into a lower sedimentation receiving portion and an upper effluent receiving portion, a rotary centrifugal basket mounted in the casing above the tank and having an opening in its bottom, high and low speed motors mounted on the substantially horizontal portion of the base and operatively connected to the basket to rotate the same, suction pumps mounted on the substantially horizontal portion of the base and having communication with the upper and lower portions of the tank, and a gear mechanism mounted in the base common to the motors and the pumps and operatively connected thereto and to the basket for rotating the basket at different speeds by the motors and to operate the pumps, one of the pumps having communication with the lower portion of the tank to remove sedimentation therefrom and the other pump having communication with the upper portion of the tank to remove effluent therefrom.

3. A centrifugal separating machine comprising a casing including a hollow base including a hollow substantially horizontal portion and spaced inner and outer upwardly extending walls rising from the substantially horizontal portion of the base to provide a tank, the tank having a mouth at the upper portion thereof to establish communication with the interior of the casing and the tank, the inner walls of the tank defining a passage through the base which is open at the top and bottom, a partition in the tank to divide the tank into a lower sedimentation receiving portion and an upper effluent receiving portion, a rotary centrifugal basket mounted in the casing above the tank and having an opening in its bottom, high and low speed motors mounted on the substantially horizontal portion of the base and operatively connected to the basket to rotate the same, and suction pumps mounted on the substantially horizontal portion of the base and having communication with said tank at its upper and lower portions.

4. A centrifugal separating machine comprising a casing including a separable combined base and internal tank having a vertical open-ended passage therethrough, the tank having a mouth at its top establishing communication between the interior of the casing and the interior of the tank, a rotary centrifugal basket mounted in the casing above the mouth of the tank and provided with means for the discharge of liquids from the basket to the casing for delivery into the tank through said mouth of the latter as the basket rotates, a gear mechanism in said passage having operative connection with the basket, high and low speed motors mounted on the base and having operative connection with the gear mechanism to rotate the basket, means in the tank to prevent turbulence of the liquids adjacent the bottom of the tank and to facilitate passage of sediment into the lower portion of the tank, and suction pumps mounted on the base and operatively connected to said gear mechanism and communicating with the tank at different elevations to draw liquids and sediment from the tank.

5. A centrifugal separating machine including a casing, a tank in the casing communicating with the latter, means dividing the tank into upper and lower communicating effluent and sediment receiving portions, a rotary centrifugal basket mounted in the casing above the tank for the separation of liquids from solids and to discharge the liquids into the casing for delivery to the tank, a gear mechanism in the casing operatively connected to the basket to rotate the latter, means for operating the gear mechanism, and a suction means operatively connected to said gear mechanism and having communication with said upper and lower communicating portions of the tank to draw the effluent and sediment from the tank.

6. A centrifugal separating machine including a casing, a tank in the lower portion of the casing having a mouth establishing communication between the interiors of the casing and tank, a rotary centrifugal basket having imperforate side walls and provided with seepage means at the top thereof and having an opening in its bottom, said tank having a partition therein dividing the tank into an upper effluent receiving portion and a lower sedimentation sludge receiving portion and having openings establishing communication between said upper and lower portions of the tank, said partition preventing turbulence in the lower sedimentation sludge receiving portion, means including a gear mechanism for rotating the basket to separate liquids from solids and discharge the liquids through the seepage means into the casing for delivery to the tank through the mouth of the latter and to build up a wall of solids in the basket, means for removing the solids from the basket, and power actuated means to separately remove the effluent and sedimentation sludge from the tank.

7. A centrifugal separating machine comprising a casing provided with a hollow base including a hollow substantially horizontal portion and spaced inner and outer upwardly extending walls rising from the substantially horizontal portion of the base to provide a tank, the tank having a mouth at its top to establish communication between the casing and tank, the inner wall of the tank defining a vertical passage extending through the base and the inner and outer upwardly extending base walls being connected together at intervals to provide openings leading to said passage, a gear mechanism and a casing therefor mounted in said passage of the base, a rotary centrifugal basket in the casing, a vertical shaft having operative connection with said gear mechanism, a rotary centrifugal basket secured to said shaft to rotate over the mouth of said tank to discharge liquids incident to centrifugal action from the basket to the casing for delivery to the tank through the mouth of the latter, high and low speed motors mounted on the horizontal portion of the base and located partly in two of the said openings and operatively connected to said gear mechanism to rotate the basket, pumps mounted on the horizontal portion of the base and located partly in the other of said base openings and operatively connected to said gear mechanism for separately removing effluent and sediment from said tank.

8. A centrifugal separating machine comprising a casing including a hollow base provided with an interior tank having communication at its top with the casing, a rotary centrifugal basket mounted in the casing above the tank, high and low speed motors mounted on the base, a gear mechanism disposed within the base and operatively connected to said motors and to said basket, and suction pumps mounted on the base and operatively connected to said gear mechanism and having communication with the tank at different elevations to separately remove effluent and sediment from the tank.

9. A centrifugal separating machine comprising a casing including a hollow base provided with an interior tank having communication at its top with the casing, a partition in the tank to divide the tank into an upper effluent receiving portion and a lower sedimentation sludge receiving portion, the partition being inclined and having an opening therein to facilitate deposit of the sedimentation sludge into the lower sedimentation sludge receiving portion, a rotary basket mounted in the casing above the tank, means for rotating the basket, suction pumps operatively connected to the basket rotating means and having communication with the tank at different elevations to separately remove effluent and sedimentation sludge from the tank, and means connected to one of the pumps to maintain a predetermined level of effluent in the tank.

10. A centrifugal separating machine including a casing having a base provided with a plurality of upwardly extending tank portions spaced apart to form an open central portion and a plurality of intervening spaces communicating with the open central portion of the base, a rotary centrifugal basket mounted within the casing and arranged to deliver effluent to the said tank portions, suction pumps mounted on the base at two of said intervening spaces connecting with the tank portions for separate removal of clarified effluent and sedimentation sludge, high and low speed motors mounted on the base at the other two intervening spaces, and means for connecting the high and low speed motors with the centrifugal basket and with the pumps.

11. A centrifugal separating machine including a casing having a base provided with four hollow tank portions spaced apart to form an open central portion and four intervening spaces communicating with the open central portion of the base, a rotary centrifugal basket mounted within the casing and arranged to deliver effluent to the said tank portions, suction pumps mounted on the base at two of said intervening spaces and provided respectively with effluent and sedimentation sludge pipes having inlets communicating respectively with the upper and lower portions of said tank portions of the base, and means for rotating the basket and for operating the suction pumps.

12. A centrifugal separating machine including a casing having a base provided with four hollow tank portions spaced apart to form an open central portion and four intervening spaces communicating with the open central portion of the base, a rotary centrifugal basket mounted within the casing and arranged to deliver effluent to the said tank portions, suction pumps mounted on the base at two of said intervening spaces and provided respectively with effluent and sedimentation sludge pipes having inlets communicating respectively with the upper and lower portions of said tank portions of the base, high and low speed motors mounted upon the base at the other two of said intervening spaces, and gearing for connecting the motors with the centrifugal basket and the suction pumps for operating the same.

13. A centrifugal separating machine including a casing having a base portion provided with a plurality of hollow upwardly extending tank portions spaced apart to form an open central portion and a plurality of intervening spaces communicating with the open central portion of the base, the latter being also provided with a hollow bottom tank portion communicating with the said tank portions, a rotary centrifugal basket mounted within the casing and arranged to deliver effluent to the upwardly extending tank portions, suction pumps located at two of the said intervening spaces and having inlets communicating respectively with the upwardly extending tank portions and with the hollow bottom portion of the base for the separate removal of clarified effluent and sedimentation sludge.

14. A centrifugal separating machine including a casing having a base provided with four hollow upwardly extending tank portions spaced apart to form an open central portion and four intervening spaces communicating with the open central portion of the base, a rotary centrifugal basket mounted within the casing and arranged to deliver effluent to the said tank portions, suction pumps mounted on the base at two adjacent intervening spaces and connected with the tank portions for the separate removal of clarified effluent and sedimentation sludge, and high and low speed motors mounted on the base at the other two adjacent intervening spaces and arranged at right angles to each other, and means for connecting the high and low speed motors with the centrifugal basket and with the pumps.

15. A centrifugal separating machine including a casing, a rotary centrifugal basket mounted within the casing, a tank in the casing arranged below the centrifugal basket in position to receive effluent from the basket as the effluent flows from the basket incident to centrifugal action, a horizontally disposed partition arranged within the tank to divide the tank into upper and lower compartments, the partition having an opening to establish communication between the upper and lower portions of the tank, vacuum means connected with the tank at the upper and lower portions thereof for the separate removal of clarified effluent and sedimentation sludge from the tank, and a gear mechanism common to the basket, motors and vacuum means for operatively connecting the basket, motors and vacuum means together for the rotation of the basket and for the removal of the clarified effluent and sedimentation sludge from the tank.

16. A centrifugal separating machine including a casing having a hollow base forming an effluent receiving and sedimentation and settling tank, a central vertical shaft journaled in the casing and having its lower end extended into the hollow base, a rotary centrifugal basket mounted on the vertical shaft, a horizontal gear fixed to the lower end of the vertical shaft, high and low speed motors mounted on the base and having horizontal shafts provided with vertical gears meshing with the said horizontal gear for rotating the basket at a high purging speed and a low cleaning speed and suction pumps also mounted on the base and provided with horizontal shafts having vertical gears meshing with the said horizontal gear, and effluent and sedimentation pipes extending from the suction pumps to the tank and having inlets arranged to remove clarified effluent and sedimentation sludge separately from the said tank, the inlets of the suction pumps being arranged to maintain the effluent within the tank normally at a predetermined level.

17. A centrifugal separating machine including a casing having a base provided with four integral tank portions spaced apart to form a central portion and four intervening spaces communicating with the open central portion, said base having hollow portions at the bottom connecting and communicating with the tank portions, a rotary centrifugal basket operating within the casing and arranged to deliver effluent to the said tank portions, vacuum means communicating with the tank portions at different elevations for the separate removal of clarified effluent and sedimentation sludge, and means located within the tank portions for preventing turbulence at the top of the tank portions from affecting the sedimentation sludge at the bottom of the tank portions.

18. A centrifugal separating machine including a casing having a base provided with four integral tank portions spaced apart to form a central portion and four intervening spaces communicating with the open central portion, said base having hollow portions at the bottom connecting and communicating with the tank portions, a rotary centrifugal basket operating within the casing and arranged to deliver effluent to the said tank portions, vacuum means communicating with the tank portions at different elevations for the separate removal of clarified effluent and sedimentation sludge, partitions arranged within the tank portions of the base and having openings for the passage of sedimentation sludge and adapted to prevent turbulence at the top of the tank portions from affecting the sedimentation sludge.

19. A centrifugal separating machine including a casing having a base provided with four integral tank portions spaced apart to form a central portion and four intervening spaces communicating with the open central portion, said base having hollow portions at the bottom connecting and communicating with the tank portions, a rotary centrifugal basket operating within the casing and arranged to deliver effluent to the said tank portions, vacuum means communicating with the tank portions at different elevations for the separate removal of clarified effluent and sedimentation sludge, and horizontal partitions arranged within the tank portions and dividing the hollow base into upper and lower chambers and having openings for the passage of sedimentation sludge, said partitions being adapted to prevent turbulence at the top of the tank portion from affecting the sedimentation sludge.

20. A centrifugal separating machine including a casing having a base provided with four integral tank portions spaced apart to form a central portion and four intervening spaces communicating with the open central portion, said base having hollow portions at the bottom connecting and communicating with the tank portions, a rotary centrifugal basket operating within the casing and arranged to deliver effluent to the said tank portions, vacuum means communicating with the tank portions at different elevations for the separate removal of clarified effluent and sedimentation sludge, and inclined partitions located within the said tank portions and dividing the same into upper and lower chambers, said partitions extending downwardly and outwardly and having openings for the passage of sedimentation sludge.

21. A centrifugal separating machine including a casing, a rotary centrifugal basket mounted within the casing, a tank arranged within the lower portion of the casing and having a mouth at its top to establish communication between the interior of the casing and the tank, a rotary centrifugal basket mounted in the casing above the tank for the discharge of liquids therefrom into the casing for delivery to the tank, means for rotating the basket to aerate the liquids as the liquids discharged from the basket pass through the casing to the tank, means dividing the tank into upper and lower communicating portions, one to receive effluent and the other portion to receive sedimentation sludge, means for feeding chemicals to the tank at the upper portion thereof to facilitate clarification of the liquids and precipitation of solids in suspension in the tank, and separate means operatively connected with the means for rotating the basket for removing clarified effluent and sedimentation sludge from the tank.

22. A centrifugal separating machine comprising a casing provided with a base including upwardly directed spaced walls forming an effluent receiving tank which has a mouth at its top establishing communication with the interior of the casing and having a main interior effluent receiving portion and interior vertical effluent receiving portions separated from one another and disposed substantially circumferentially of the base and communicating with the main effluent receiving portion, a rotary centrifugal basket mounted in the casing above the tank for the discharge of fluids from the basket into the casing incident to centrifugal action for delivery to the tank through the mouth of the latter, means for rotating the basket, and means for the discharge of the effluent and sedimentation sludge from the tank.

23. A centrifugal separating machine comprising a casing provided with a base including upwardly directed spaced walls forming an effluent receiving tank which has a mouth at its top establishing communication with the interior of the casing and having a main interior effluent receiving portion and interior separated vertical effluent receiving portions communicating with the main effluent receiving portion, a rotary centrifugal basket mounted in the casing above the tank for the discharge of fluids from the basket into the casing incident to centrifugal action for delivery to the tank through the mouth of the latter for precipitation therein to separate sludge sedimentation from the effluent, means for rotating the basket, vacuum means mounted on the base and communicating with the interior of the tank for the withdrawal of the separated effluent from the tank, and vacuum means on the base for withdrawing the separated sediment sludge from the tank.

24. A centrifugal separating machine comprising a casing provided with a base including upwardly directed spaced walls forming an effluent receiving tank which has a mouth at its top establishing communication between the interior of the casing, the tank having an interior main effluent receiving portion and interior separated vertical effluent receiving portions communicating with the main effluent receiving portion, the inner wall of the tank defining a vertical passage extending entirely through the base, a rotary centrifugal basket mounted in the casing above the tank for discharge of fluids from the basket into the casing incident to centrifugal action for delivery to the tank through the mouth of the latter and at the same time build up a wall of solids against the side walls of the basket, the basket having a discharge opening in its bottom, means for rotating the basket, means for removing the built-up wall of solids from the basket for discharge through the discharge opening in the bottom of the basket for delivery to the passage defined by the inner walls of the tank, and means for the discharge of the effluent and sedimentation sludge from the tank.

25. A centrifugal separating machine including a casing, a rotary centrifugal basket mounted in the casing, the casing having an interior tank arranged to receive effluent from the basket, high and low speed motors, suction pumps connected with the tank, and a gearing mechanism common to the basket, the pumps and the motors for operating the basket and pumps under the influence of the motors, and means operable for connecting either motor with the basket, said pumps being operable together or independently of each other.

26. A centrifugal separating machine comprising a casing with a hollow base including an effluent receiving tank having a mouth at its top to establish communication between the casing and the tank, intersecting braces extending across the hollow base to strengthen the same and at their point of intersection having a bearing and a depending rectangular-shaped gear casing, a vertical shaft having its lower end mounted in said bearing, a rotary centrifugal basket secured to said shaft, a gear mechanism confined in said gear casing and having operative connection with the basket shaft, high and low speed motors mounted on the base and having operative connection with said gear mechanism through side walls of the gear casing, suction pumps mounted on the base and having operative connection with said gear mechanism through side walls of the gear casing and also having communication with the interior of said tank to draw liquids and sedimentation sludge from the tank, means to supply a chemical to the effluent in the tank, and means supplying steam or the like to the tank through a portion of the chemical supply means.

JOSEPH S. PECKER.

CERTIFICATE OF CORRECTION.

Patent No. 2,056,887.

October 6, 1936.

JOSEPH S. PECKER.

It is hereby certified that error appears in the printed specification of the above numbered patent requiring correction as follows: Page 1, second column, line 33, before the word "sludge" insert primary; and that the said Letters Patent should be read with this correction therein that the same may conform to the record of the case in the Patent Office.

Signed and sealed this 8th day of December, A. D. 1936.

Henry Van Arsdale

Acting Commissioner of Patents.

(Seal)